United States Patent [19]
Storbacka

[11] Patent Number: 5,769,156
[45] Date of Patent: Jun. 23, 1998

[54] ECONOMIZER SYSTEM WITH SIDE-BY-SIDE ECONOMIZERS

[75] Inventor: Jan Storbacka, Varkaus, Finland

[73] Assignee: Ahlstrom Machinery Oy, Helsinki, Finland

[21] Appl. No.: 657,843

[22] Filed: May 31, 1996

[30] Foreign Application Priority Data

Jun. 2, 1995 [FI] Finland ................................. 952707

[51] Int. Cl.⁶ ............................ F28F 9/22; F22D 1/02
[52] U.S. Cl. ...................... 165/145; 165/168; 165/169; 122/7 R; 122/421
[58] Field of Search .................................. 122/420, 421, 122/422, 1 A, 1 C, 5, 7 R; 165/145, 168, 169

[56] References Cited

U.S. PATENT DOCUMENTS

| | | | |
|---|---|---|---|
| 1,878,176 | 9/1932 | Parker et al. | 122/421 |
| 2,075,044 | 3/1937 | Lucke | 165/101 |
| 2,702,235 | 2/1955 | Hochmuth | 422/185 |
| 2,936,215 | 5/1960 | Hochmuth | 423/207 |
| 2,983,260 | 5/1961 | Huet | 122/32 |
| 3,768,447 | 10/1973 | Källstrand | 122/421 |
| 3,915,654 | 10/1975 | Oni et al. | 422/185 |
| 4,031,862 | 6/1977 | Smith | 122/421 |
| 4,479,536 | 10/1984 | Lameris | 165/145 |
| 4,739,729 | 4/1988 | Rettemeier et al. | 122/476 |
| 5,247,907 | 9/1993 | Lee et al. | 122/1 R |

FOREIGN PATENT DOCUMENTS

| | | | |
|---|---|---|---|
| 3126/72 | 11/1972 | Finland. | |
| 98936 | 5/1997 | Finland. | |
| 30 29 908 A1 | 3/1982 | Germany | 122/7 R |
| 4-45301 | 2/1992 | Japan | 122/7 R |
| 5-203103 | 8/1993 | Japan | 122/420 |
| 7633 | 12/1897 | Norway | 122/420 |
| 1023169 A | 6/1983 | U.S.S.R. | 122/1 A |
| 1310579 A1 | 5/1987 | U.S.S.R. | 122/1 A |
| 1442783 A2 | 12/1988 | U.S.S.R. | 122/7 R |
| 1453115 A1 | 1/1989 | U.S.S.R. | 122/1 A |

*Primary Examiner*—Ira S. Lazarus
*Assistant Examiner*—Ljiljana V. Ciric
*Attorney, Agent, or Firm*—Nixon & Vanderhye P.C.

[57] ABSTRACT

An otherwise conventional recovery boiler for burning black liquor requires less capital investment and takes up less space by constructing the economizers in a particular manner. At least first and second economizers are provided for preheating feed water utilizing flue gas from combustion of the black liquor. The economizers are positioned substantially side-by-side, in the width dimension of the recovery boiler furnace, and connected in such a way that flue gas leaving the first economizer passes in a substantially transverse horizontal direction and then through a substantially vertical intra-economizer flow channel into the second economizer. A boiler bank may be connected between the superheater section of the recovery boiler and the first economizer, and any number of economizers may be utilized.

22 Claims, 4 Drawing Sheets

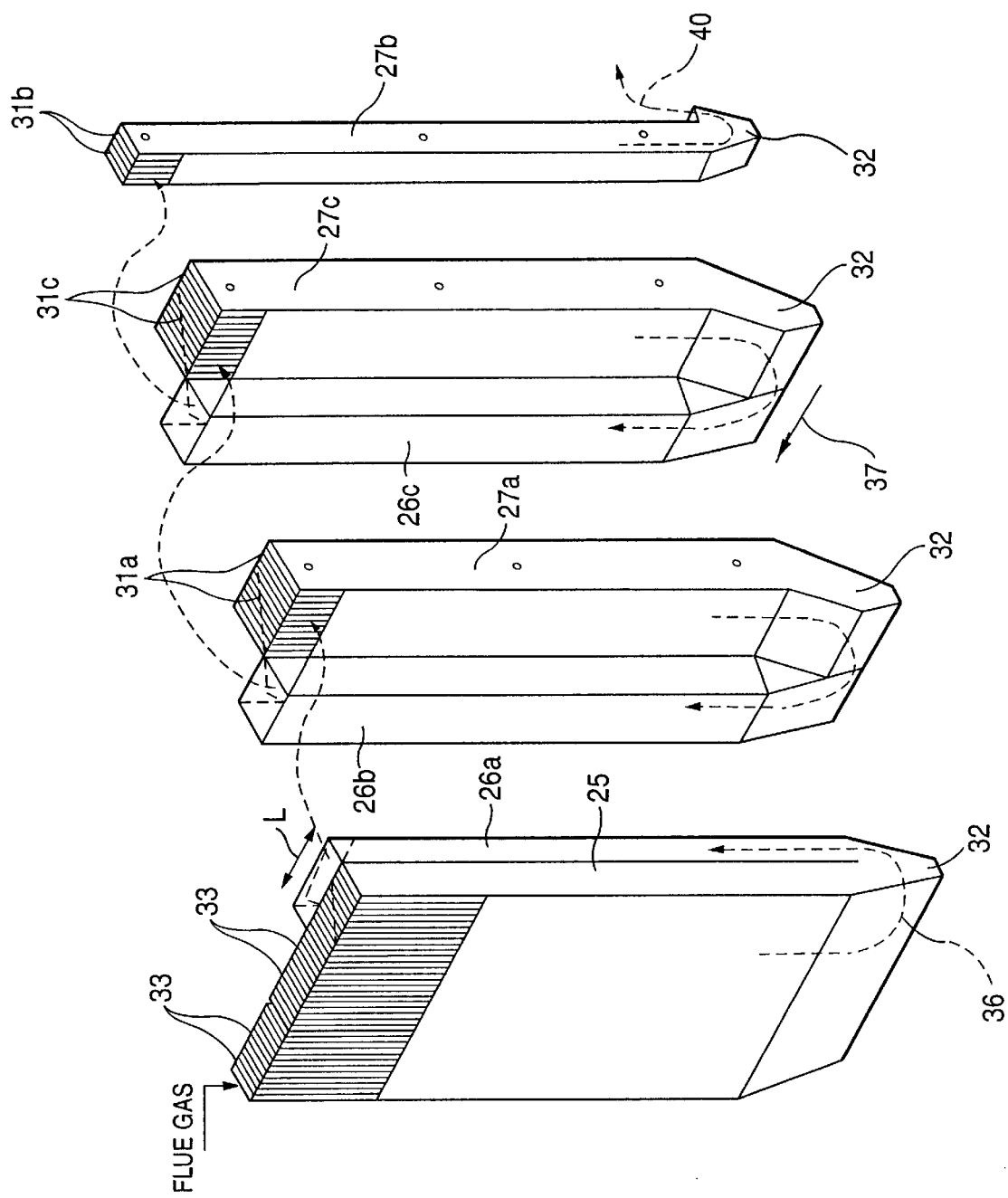

ECONOMIZER SYSTEM WITH SIDE-BY-SIDE ECONOMIZERS

BACKGROUND AND SUMMARY OF THE INVENTION

The present invention relates to an apparatus and method for heat recovery of flue gases generated by the burning of waste liquor, e.g. black liquor, in the sulphate cellulose pulp industry, in which feed water in a boiler is heated by economizers, and to an economizer system per se utilizable with other boilers In the manufacture of chemical pulp, lignin and other organic non-cellulosic substances are separated from the raw material of the chemical pulp by cooking with chemicals. The spent cooking liquor, i.e. the waste liquor, is recovered. The waste liquor that is mechanically separated from chemical pulp has a high thermal value due to the carbonaceous and other organic combustible materials therein. The waste liquor additionally contains inorganic chemicals that did not react during cooking of the chemical pulp. Several different methods have been developed to recover the heat and chemicals of the waste liquor.

The black liquor received from sulphate pulp production is usually burnt in a recovery boiler. As the organic and carbonaceous substances are burning, the inorganic components in the waste liquor turn into chemicals that can be recycled and reutilized in the cooking process.

Hot flue gases are generated during burning of black liquor, which gases are passed into contact with various heat exchangers in the recovery boiler. Flue gases transfer heat into water, steam, or a mixture of water and steam flowing in the heat exchangers, simultaneously cooling during transfer. Flue gases generally contain a great deal of ash. The largest part of the ash is sodium sulfate, and the second largest part is sodium carbonate. In addition, there are other components of the ash. In the furnace of the boiler, the ash passing along with the flue gases is largely in the form of vapor, and is begins to turn into fine dust and melt drops (primarily in the portions of the system after the furnace). The salts contained in the ash will melt or turn into adhesive particles at a relatively low temperature. The molten and adhesive particles easily stick to heat exchange surfaces and even corrode them. The deposits formed by adhesive ash have resulted in a significant risk of clogging of the flue gas channels, make heat surfaces in the boiler corrode and deteriorate, and reduce the heat transfer efficiency thereof.

It is well known that a recovery boiler is the most expensive individual piece of equipment investment for a chemical pulp mill. Therefore boilers have to be subjected to continuous development so that they can be constructed at a lower cost. A typical economizer system for recovery boilers is conventionally constructed in such a way that there are one-three economizers disposed one after the other in a first horizontal path of flue gas from the recovery boiler furnace. The flue gas usually flows upwardly in a flow channel to an inlet at the top of the economizer, exiting from the bottom of the economizer and then flowing through another flow channel to the top of the next economizer. Each economizer has a width substantially the same as the width of the outlet section from the recovery boiler.

According to the present invention an economizer system, particularly for use with a recovery boiler, but also for use in other applications, and a method of operation thereof, are provided which require less space than conventional economizers, can be operated more economically than conventional economizers, yet are capable of efficiently recovering heat from the flue gas. These desirable results are achieved, in the most basic concept, by providing the economizers (whether two, three or more in number) in substantially side-by-side relationship, in a second horizontal direction substantially transverse to the first, and the economizers collectively typically having a width that is about the same as the width of the recovery boiler outlet with which they are associated. Utilizing this arrangement a number of significant advantages may be achieved. These include:

- In modern automated welding lines it is significantly easier to manufacture wide finned tube panels than twice as many narrower panels. The construction according to the invention uses half as many wide finned tube panels as the narrower panels used in conventional economizers.
- There are only half as many distributing and collecting headers in the economizers according to the invention as compared to known economizers, and even though there is an increase in the length of the individual headers because the number decreases the expense decreases.
- According to the invention there are only half as many connecting tubes for main distributing and main collecting headers than are provided in conventional economizers, and the main distributing headers are only half as long.
- The caulking of the front and back walls of conventional economizers is typically an expensive procedure. Since the length of those walls are only half that of conventional economizers according to the invention, caulking is much easier and less expensive.
- Because the panel elements of the economizers according to the invention have increased length, it is possible to use a "soot pass" which is not useful with conventional narrower elements.
- The economizer system according to the invention can use only half as many soot blowers (typically three-four less) than conventional economizers.
- The number of ash conveyors and feeders is less in the economizer system according to the invention than in conventional systems; and
- Even though the length of the elements increase, the total length of the boiler plant does not increase due to the side-by-side placement of the economizers according to the invention.

The designation "economizer" as used in the present specification and claims is only to denote heat exchange units used for heat transfer, and the scope of the invention is not be limited by the use of this term to any particular design of a gas-to-liquid heat exchanger. An "economizer" is any heat exchanger (or plurality or grouping of heat exchangers) comprising heat exchange elements in which feed water to be heated flows inside the elements. Between the heat exchange elements of an economizer there is space for flowing flue gas. As the flue gas flows past the heat exchange elements, heat is transferred into the feed water flowing inside the elements.

While the invention will be described herein in association with recovery boilers in pulp processing chemical plants it should be understood that the invention is applicable to other types of boilers as well, including (but not limited to) power plant boilers.

According to one aspect of the present invention an economizer system for recovering heat energy from hot gas flowing in a first generally horizontal direction is provided.

The economizer system comprises the following components: A source of hot gas including an outlet from which the hot gas flows with a first generally horizontal direction. First and second economizers for heating liquid flowing therethrough by bringing the liquid into heat exchange relationship with the hot gas, the economizers downstream, in the first generally horizontal direction of the gas, of the source of hot gas and mounted side-by-side, extending in a second generally horizontal direction substantially transverse to the first direction. And, an intra-economizer flow channel extending between the first and second economizers for directing hot gas exiting the first economizer after flowing in heat exchange relationship with the liquor flowing within the first economizer, into the second economizer to flow in heat exchange relationship with the liquor flowing within the second economizer.

Preferably the first and second economizers each have a top and a bottom with an inlet adjacent the top and an outlet adjacent the bottom, and the intra-economizer flow channel extends from the outlet of the first economizer into the inlet of the second economizer. The source typically has a top and a bottom with an outlet adjacent the bottom, and the system further comprises an inlet flow channel extending from the source outlet to the first economizer inlet. The inlet flow channel and the intra-economizer flow channel are also mounted side-by-side, substantially parallel to and adjacent the first and second economizers, and between the first and second economizers and the source. Typically the first and second economizers each have a width dimension, extending in the second direction, and a heat exchanger area, and the width dimension and heat exchanger area of the first economizer may be greater than the width dimension and heat exchanger area of the second economizer. The first and second economizers may be separated from each other only by a partition wall, which may be a heat exchange element (having liquid circulating therein), or a simple steel plate.

Any number of economizers may be provided. For example there may be a third economizer, having a top and bottom and an inlet adjacent the top and an outlet adjacent the bottom, and a second intra-economizer flow channel, the third economizer mounted side-by-side with the second economizer extending in the second direction, and the second intra-economizer flow channel mounted side-by-side with the first intra-economizer flow channel, and transporting gas from the second economizer outlet to the third economizer inlet.

According to another aspect of the present invention a recovery boiler is provided comprising the following components: A furnace, having a capacity of less than about 1400 tons of dry solids per twenty four hours, for burning waste liquor to produce flue gas, and defining a path of flue gas movement. First and second economizers for preheating feed water flowing thereto by bringing the feed water into heat exchange relationship with the flue gas, the economizers downstream, in the path of flue gas movement, and positioned in heat exchange relationship with the flue gas. And, wherein the economizers are positioned substantially next to each other in a horizontal direction substantially transverse to the path of flue gas movement from the furnace, and connected in such a way that flue gas leaving the furnace must first flow through the first economizer, and then through the second economizer. The details of the economizers, including the provision of the inlet channel and intra-economizer flow channels, are preferably as described above.

According to another aspect of the present invention a recovery boiler is provided comprising the following components: A furnace for burning waste liquor to produce flue gas, and defining a path of flue gas movement and having an outlet, and a width at the outlet. First and second economizers for preheating feed water flowing thereto by bringing the feed water into heat exchange relationship with the flue gas, the economizers in the path of flue gas movement, and positioned in heat exchange relationship with the flue gas. And, wherein the economizers, collectively, have a width that is approximately the same as the width of the furnace at the furnace outlet, the economizers being positioned substantially next to each other and connected in such a way that flue gas leaving the furnace must first flow through the first economizer, and then through the second economizer. The details of the economizers, including the provision of the inlet channel and intra-economizer flow channels, are preferably as described above.

According to another aspect of the present invention a method of operating a recovery boiler having a furnace with an upper portion in which flue gas flows, and first and second economizers, is provided. The method comprises the steps of: (a) Burning cellulose pulp production waste liquor in the recovery boiler furnace so that flue gas is generated and flows upwardly to the upper portion of the furnace, and then flows in a first horizontal direction. (b) Causing the flue gas to flow from the upper portion of the furnace into the first economizer in the first horizontal direction, cooling the flue gas in the first economizer, and causing the cooled gas to exit the first economizer. And, (c) causing the flue gas to flow from the first economizer in a second horizontal direction substantially transverse to the first direction to enter the second economizer, cooling the flue gas in the second economizer, and causing the cooled gas to exit the second economizer.

In the method as described desirably step (b) is practiced by causing the flue gas to flow downwardly from the upper portion of the furnace and then upwardly in an inlet channel, and then downwardly from the inlet channel in the first economizer; and step (c) is practiced by causing the flue gas to flow in the second horizontal direction to an intra-economizer flow channel and then to flow upwardly in the intra-economizer flow channel and then downwardly in the second economizer.

It is the primary object of the present invention to provide an economizer system, particularly though not exclusively associated with a recovery boiler for combusting black liquor, which is less expensive and takes up less space than conventional economizer systems. This and other objects of the invention will become clear from an inspection of the detailed description of the invention and from the appended claims.

BRIEF DESCRIPTION OF THE DRAWINGS

FIG. 4 is a view like that of FIG. 3 only showing the utilization of three economizers according to the invention instead of two.

DETAILED DESCRIPTION OF THE DRAWINGS

Figure 1:
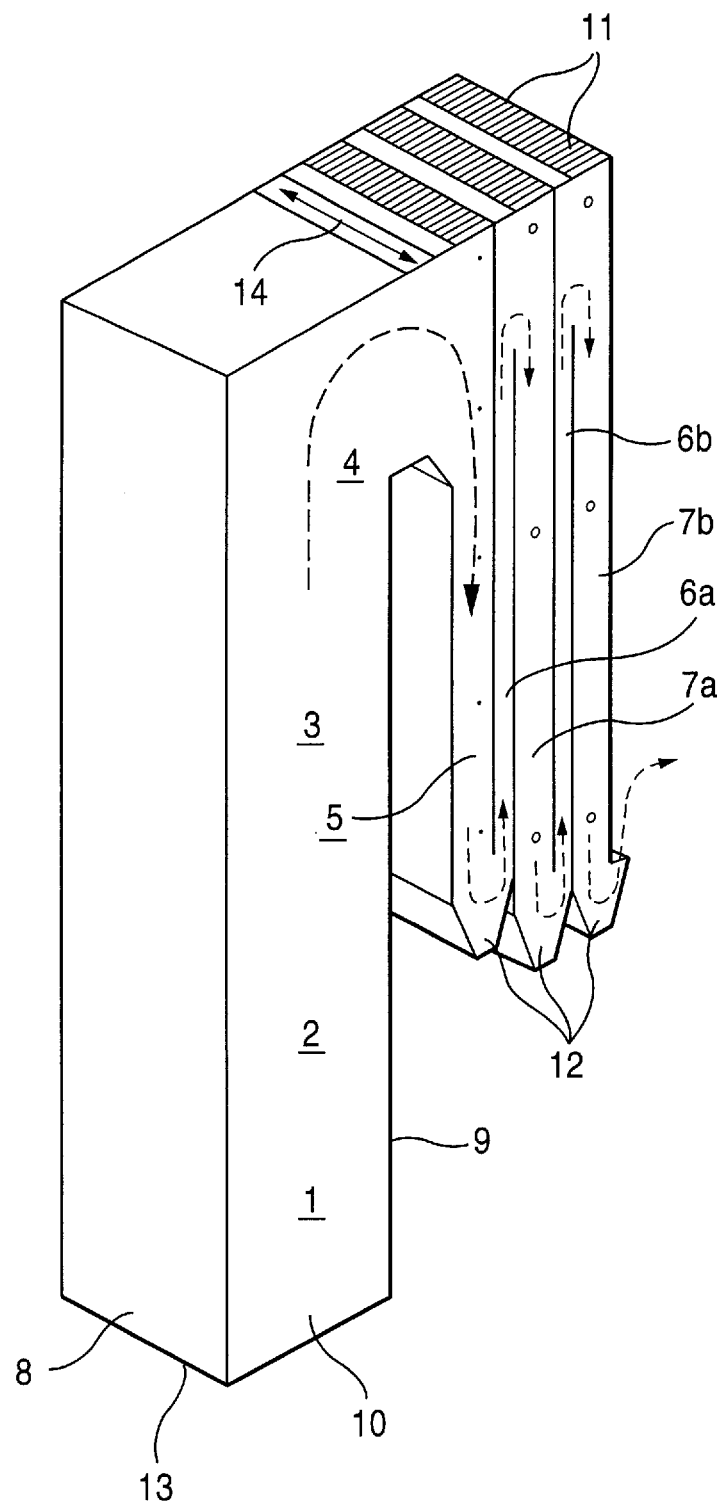
FIG. 1 is a top perspective schematic view of a conventional recovery boiler and economizer system according to the prior art.

A conventional recovery boiler for combusting waste liquor (e.g. black liquor) typically comprises the following main components that are schematically illustrated in FIG. 1:

-A lower part 1 of the furnace, in which burning of the waste liquor is primarily performed.

-A middle part 2 of the furnace, in which final combustion of the gaseous combustible substances primarily occurs.

-An upper part 3 of the furnace.

-A superheater zone 4, in which the temperature of the saturated vapor coming from a steam drum (not shown) is raised (the vapor being thus superheated). In the superheater zone 4, or upstream thereof, there is usually a screen boiler surface or screen tube system, which also functions as a water boiler.

-A boiler bank or steam-generating section 5, in which water at a saturated temperature is boiled into vapor.

-Economizers 7a, 7b, in which the feed water flowing in the heat exchange elements is pre-heated prior to the water being passed into a drum (not shown), the boiler bank 5 and the superheating zone 4. An inlet channel 6a leads flue gas from the boiler bank 5 to first economizer 7a, and an intra-economizer flow channel 6b leads gas from the first economizer 7a to the second economizer 7b. The drum (i.e. steam drum) may have water in the lower part thereof and saturated vapor in the upper part thereof. Some boilers are provided with two drums: a vapor drum (upper drum) and a water drum (lower drum), between which a heat exchanger (i.e. boiler bank tubes) is located.

-A front wall 8, back wall 9, side walls 10, and a bottom 13 defining the furnace.

-At the turning points of the flue gas at the bottoms of the structures 5, 7a, 7b, are conventional ash hoppers 12 in which part of the ash accumulates. The ash is led from the hoppers 12 to the chemical recovery loop of the pulp mill by conventional conveyors.

-Other standard boiler parts and equipment, e.g. a combustion air system, a flue gas system, a feeding system for black liquor to be burned, a treatment system for melt and liquor, feed water pumps, etc., may be provided but are not illustrated.

Associated with the economizers 7a, 7b are heat exchangers 11 which are heated by the flue gas. The heat exchange surfaces 11 are typically finned tube panel elements positioned adjacent each other and utilizing the entire width 14 of the boiler (that is the width of the walls 8, 9).

The flue gas flows from the upper part 4 of the furnace, as the upper, left arrow in FIG. 1 shows, and then downwardly in the boiler bank 5, (through the inlet gas channel 6a adjacent to the boiler bank 5), and then upwardly to the economizer 7a (i.e. to the "hot" economizer) and downwardly therefrom, through the intra-economizer gas channel 6b, then passing upwardly again to the following economizer 7b (i.e. to a "cold" economizer) through which the gas flows downwardly. In a conventional recovery boiler, there are occasionally three feed water economizers connected in series. In the hot economizer the temperatures of both the flue gas and the feed water are higher than in the "cold" economizer.

The economizers 7a, 7b are connected in series so as to enable flowing of the feed water therein. The water is at first brought to the "cold" economizer 7b. In each economizer there are distributing and collecting headers for the flowing water, which headers are connected to the headers of each heating element. The water is brought into the lower header of the "cold" economizer 7b, from which it rises through the elements into the upper header, and from there through the outside of the boiler to the distributing header of the "hot" economizer 7a. From the upper header of the "hot" economizer 7a the water is led to the boiler bank 5.

When an appropriate gas flow velocity is chosen and steam soot blowers used, the above-described conventional economizers usually operate satisfactorily. The flow velocity of the flue gas in an economizer has an optimum, i.e. too low a velocity lessens the heat exchange efficiency, while too high a velocity causes clogging of the flow passages. The risk of clogging has resulted in more expensive constructions being built, for smaller boilers (e.g. about 1400 tons of dry solids/twenty four hours) in particular. The width of the panel element in an economizer is notable, which increases the length of the whole boiler plant and hence raises the costs of the plant.

Figure 2:
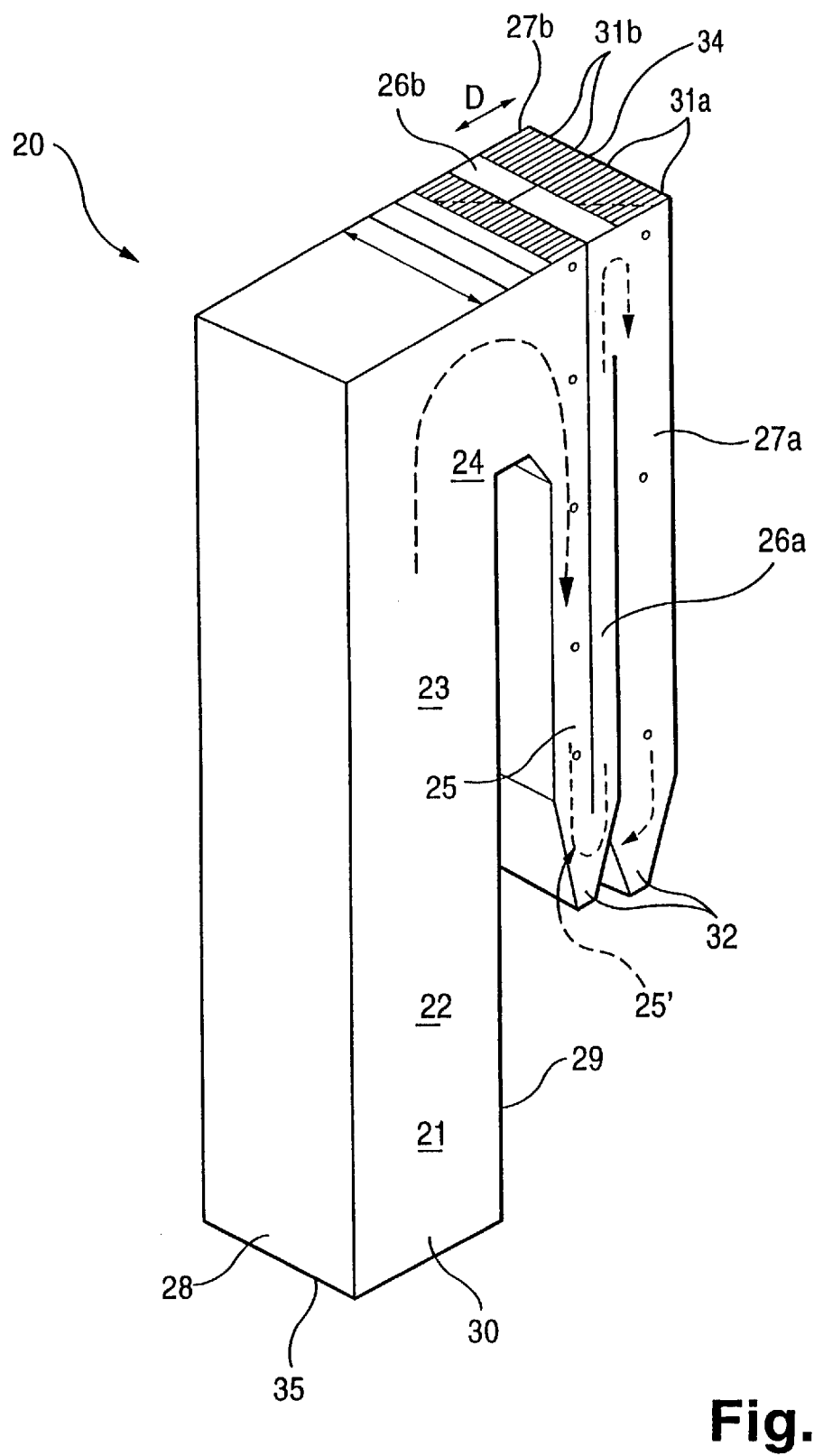
FIG. 2 is a view like that of FIG. 1 illustrating an economizer system according to the invention in association with a conventional recovery boiler.

An exemplary recovery boiler 20 according to the invention is illustrated schematically in FIG. 2 comprises—similar to the conventional boiler of FIG. 1—a lower part 21, a middle part 22, and an upper part 23. The furnace is limited by a front wall 28, a back wall 29, side walls 30 and a bottom 35. The form of the furnace may be different from the conventional rectangular form, e.g. another polygon (triangle, hexagon, trapezoid, or the like). The heat recovery part of the boiler 20 comprises superheaters 24, a boiler bank 25, and an economizer system comprising flue gas inlet channel 26a and intraeconomizer channel 26b, and two economizers 27a, 27b. In this arrangement the gas channels 26a, 26b are located side by side after the boiler bank 25, and parallel to the economizers 27a, 27b and between the economizers 27a, 27b and the boiler bank 25. The boiler 20, superheater 34, and boiler bank 25 may collectivelly provide the source of hot gas, the outlet 25' (see FIG. 2) from the boiler bank 25 being connected to the inlet at the top (see the looped arrow in FIG. 2) of the first economizer 27a by the inlet flow channel 26a.

The channels 26a, 26b are also substantially parallel to the front wall 28 and back wall 29 of boiler 20. The economizers 27a, 27b are also located side by side, in a single row. The width of the collective economizers 27a, 27b (and flow channels 26a, 26b) is substantially the same as the width 14 of the boiler 20.

The economizers 27a, 27b comprise finned tube panel elements 31a, 31b, in which the feed water to be heated flows in the opposite direction relative to the flue gas, i.e. upwardly from below. The wall 34 divides the economizers 27a, 27b, and may be a finned tube panel in which liquid circulates, or a simple steel plate wall.

Figure 3:
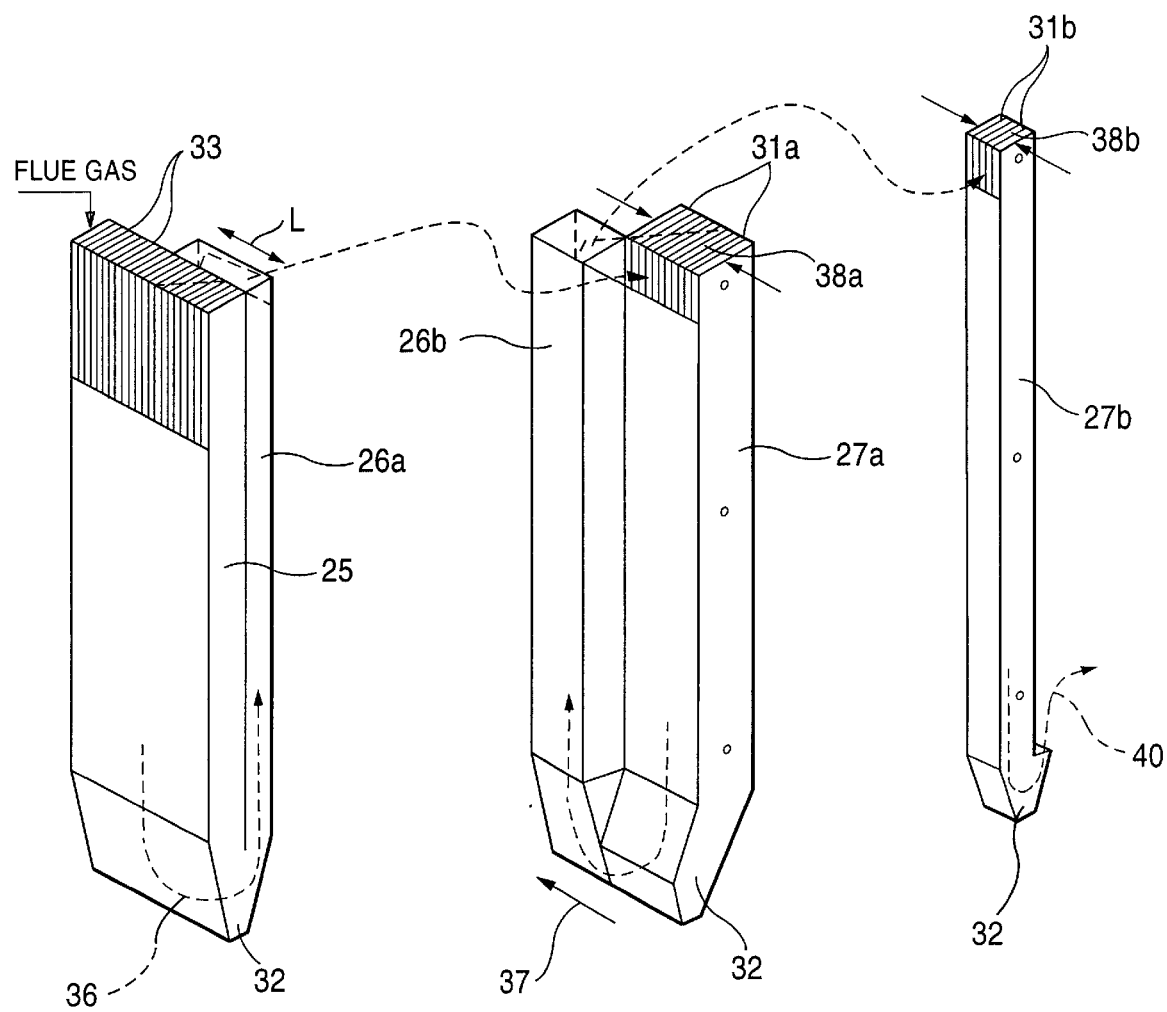
FIG. 3 is an exploded perspective schematic view of the boiler bank section and economizers of the apparatus of FIG. 2.

As indicated by the arrows in FIGS. 2 and 3, the flue gas is directed from the furnace of boiler 20 through the superheaters to the upper part of the boiler bank 25 and then downwardly through the boiler bank 25. The gas releases heat into the water flowing in the elements 33 of the boiler bank 25. Subsequently, the gas is led into the gas inlet channel 26a, from the upper part of which the flue gas is directed to the first "hot" economizer 27a. The width L of the gas channel 26a following the boiler bank 25 is preferably substantially the same as the corresponding width of the first economizer 27a.

Passing through the economizer 27a downwardly from above, the flue gas transfers heat into the feed water flowing in the elements 31a. Subsequently, the gas is led into the lower part of the first intraeconomizer gas channel 26b, flowing in a second horizontal direction 37 which is substantially transverse to the first horizontal direction 36 of the gas from the furnace section 23. From the upper part of the channel 26a the flue gas is directed into the "cold" economizer 27b, in which the gas heats the feed water flowing in the elements 31b. The gas exits through an outlet in a lower part of the economizer 27b. Ash may be withdrawn through conventional hoppers 32.

The finned tube panel elements 31a and 31b of the economizers 27a and 27b are preferably of the same width, the number of the elements in the hotter economizer 27a being, however, preferably greater than in the colder economizer 27b. The elements 33 of the boiler bank 25 are, in the vertical direction, preferably shorter than the elements 31a, 31b in the economizers 27a, 27b.

In the construction in accordance with the invention the width D (FIG. 2) of the heat exchange elements is greater than in conventional economizer systems, but there is no increase in the length of the boiler 20.

The invention is also applicable to other economizer heating exchange surface structures than finned tube panels. For example (only), the heat exchangers may be formed by "tangent tube elements" constituted of tubes connected to each other side by side, or by elements formed of "loose tubes" positioned side by side. "Loose tubes" are not welded together, i.e. connected adjacent to each other.

Also the boiler bank 25 may be positioned adjacent to the economizers 27a, 27b, or the invention is also applicable to boilers with no boiler bank 25 at all.

The economizer system in accordance with the invention is especially suitable for very small-sized and mid-sized chemical recovery boilers, typically having a liquor-combusting capacity of less than about 1400 tons of dry solids per twenty-four hours.

The first and second economizers 27a, 27b may each have a width 38a, 38b extending in the second direction 37, and a heat exchanger area (effective heat exchange surface area of the elements 31a, 31b). In the embodiment illustrated in FIG. 3 the first economizer 27a width dimension 38a and heat exchanger 31a area are greater than the width dimension 38b and heat exchanger 31b area of the second economizer 27b. Alternatively these widths and areas may be the same.

The invention is also suitable for use in systems where there are three, four, or even more economizers disposed side-by-side. For example FIG. 4 schematically illustrates a situation in which three economizers are provided. In this situation the third economizer 27c, having a second intra-economizer gas flow channel 26c associated therewith, is disposed between the first and second economizers 27a, 27b in the second direction 37. In this way the channels 26a–26c will be side-by-side in the direction 37, parallel to the elements 33 of the boiler bank 25, and parallel to the economizers 27a–27c and between the economizers 27a–27c and the boiler bank 25.

In FIG. 4 the widths and heat exchange areas of the economizers 27a and 27c are shown as approximately the same while those of the economizer 27b are smaller, but the widths and heat exchange areas of all of the economizers 27a–27c may be the same, or may gradually decrease from the hottest economizer 27a, through the next hottest economizer 27c, to the coldest economizer 27b.

It will thus be seen that according to the present invention—with particular reference to FIGS. 2 and 3—cellulose pulp production waste liquor (e.g. black liquor, for example having a consistency of between about 50–80%) is burned in the furnace portions 21, 22 of the recovery boiler 20 so that flue gas is generated and flows upwardly to the upper portion 24 of the furnace and then flows in a first horizontal direction 36. The flue gas is then caused to flow from the upper portion 24 of the furnace (for example first through the boiler bank 25 and then upwardly through the inlet flow channel 26a) into the first economizer 27a in the first horizontal direction 36, the flue gas being cooled as it flows downwardly in the first economizer 27a and heating the feed water flowing in the heat exchange elements 31a of the economizer 27a. The cooled gas then exits the first economizer 27a and is caused to flow—as indicated by arrow 37 in FIG. 3—in a second horizontal direction, substantially transverse to the first direction, to enter the second economizer 27b (e.g. flowing into the bottom of the intra-economizer flow channel 26b, then upwardly therein, and then downwardly into the second economizer 27b). The flue gas is further cooled in the second economizer 27b, heating the feed water flowing in the heat exchange elements 31b of the second economizer 27b, and the cooled gas exits the second economizer as indicated by arrow 40 in FIG. 3. Since the economizers 27a and 27b are substantially side-by-side, having a collective width 38a, 38b that is about the same as the width 14 of the boiler 20 (e.g. the walls 28, 29 thereof when the furnace is quadrate in configuration), and since the flow channels 26a, 26b are also side-by-side, the total boiler 20 construction is simplified, and less expensive, compared to the conventional recovery boiler as in FIG. 1.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures, devices, systems, and methods.

What is claimed is:

1. An economizer system for recovering heat energy from hot gas flowing therethrough, comprising:

a source of hot gas including an outlet from which the hot gas flows in a first generally horizontal direction;

first and second economizers for heating liquid flowing therethrough by bringing the liquid into heat exchange relationship with the hot gas, said economizers being downstream, in the first generally horizontal direction of the gas, of said source of hot gas and mounted side-by-side, extending in a second generally horizontal direction substantially transverse to the first direction;

an intra-economizer flow channel extending between said first and second economizers for directing hot gas exiting said first economizer after flowing in heat exchange relationship with the liquid flowing within said first economizer, from said first economizer into said second economizer to flow in a heat exchange relationship with the liquid flowing within said second economizer; and wherein said first economizer has a top and a bottom, and has a gas inlet adjacent said top and a gas outlet adjacent said bottom; wherein said second economizer has a top and a bottom, and has a gas inlet adjacent said second economizer top and a gas outlet adjacent said second economizer bottom; and wherein gas flows from said source outlet to said first economizer inlet, and said intra-economizer flow channel extends from said outlet of said first economizer into said inlet of said second economizer.

2. An economizer system as recited in claim 1 wherein said source has a top and a bottom, and an outlet adjacent said source bottom; and further comprising an inlet flow channel extending from said source outlet to said first economizer inlet.

3. An economizer system as recited in claim 2 wherein said inlet flow channel and said intra-economizer flow channel are mounted side-by-side substantially parallel to and adjacent said first and second economizers, and between said first and second economizers and said source.

4. An economizer system as recited in claim 3 wherein said first and second economizers each have a width dimension, extending in said second direction, and a heat transfer area; and wherein each of said width dimension and heat transfer area of said first economizer is greater than said width dimension and said heat transfer area, respectively, of said second economizer.

5. An economizer system as recited in claim 3 wherein said intra-economizer flow channel comprises a first intra-economizer flow channel; and further comprising: a third economizer, having a top and bottom and an inlet adjacent said third economizer top and an outlet adjacent said bottom; and a second intra-economizer flow channel; said third economizer mounted side-by-side with said second economizer extending in said second direction, and said second intra-economizer flow channel mounted side-by-side with said first intra-economizer flow channel, and transporting gas from said second economizer outlet to said third economizer inlet.

6. An economizer system as recited in claim 1 wherein said first and second economizers are separated from each other only by a partition wall.

7. An economizer system as recited in claim 6 wherein said partition wall comprises a heat exchange element having liquid circulating therein.

8. An economizer system as recited in claim 6 wherein said partition wall comprises a steel plate.

9. An economizer system as recited in claim 1 further comprising an inlet flow channel extending from said source outlet to said first economizer inlet; and wherein said inlet flow channel and said intra-economizer flow channel are mounted side-by-side substantially parallel to and adjacent said first and second economizers, and between said first and second economizers and said source.

10. An economizer system as recited in claim 9 wherein said first and second economizers each have a width dimension, extending in said second direction, and a heat transfer area; and wherein each of said width dimension and heat transfer area of said first economizer is greater than said width dimension and said heat transfer area, respectively, of said second economizer.

11. An economizer system as recited in claim 9 wherein said intra-economizer flow channel comprises a first intra-economizer flow channel; and further comprising: a third economizer, having a top and bottom and an inlet adjacent said third economizer top and an outlet adjacent said third economizer bottom; and a second intra-economizer flow channel; said third economizer mounted side-by-side with said second economizer extending in said second direction, and said second intra-economizer flow channel mounted side-by-side with said first intra-economizer flow channel, and transporting gas from said second economizer outlet to said third economizer inlet.

12. An economizer system as recited in claim 1 wherein said intra-economizer flow channel comprises a first intra-economizer flow channel; and further comprising: a third economizer, having a top and bottom and an inlet adjacent said third economizer top and an outlet adjacent said third economizer bottom; and a second intra-economizer flow channel; said third economizer mounted side-by-side with said second economizer extending in said second direction, and said second intra-economizer flow channel mounted side-by-side with said first intra-economizer flow channel, and transporting gas from said second economizer outlet to said third economizer inlet.

13. An economizer system as recited in claim 12 wherein said first and second economizers are separated from each other only by a partition wall.

14. An economizer system as recited in claim 13 wherein said partition wall comprises a heat exchange element having liquid circulating therein.

15. An economizer system as recited in claim 13 wherein said partition wall comprises a steel plate.

16. An economizer system as recited in claim 12 wherein said source of hot gas comprises a chemical recovery boiler having a furnace with a capacity of less than about 1400 tons of dry solids per 24 hours.

17. An economizer system as recited in claim 12 further comprising an inlet flow channel connecting said source outlet and said first economizer inlet; said inlet flow channel and said intra-economizer flow channel mounted side-by-side substantially parallel to and adjacent said first and second economizers, and between said first and second economizers and said source.

18. An economizer system as recited in claim 12 wherein said source has a width in said second direction, and wherin said first, seond and third economizers, collectively, have a width that is essentially the same as said width of said source at said source outlet.

19. An economizer system as recited in claim 1 wherein said source of hot gas comprises a chemical recovery boiler having a furnace with a capacity of less than about 1400 tons of dry solids per 24 hours.

20. An economizer system as recited in claim 1 wherein said source has a width in said second direction; and wherein said first and second economizers, collectively, have a width that is essentially the same as said width of said source at said source outlet.

21. An economizer system for recovering heat energy from hot gas flowing therethrough, comprising:

a source of hot gas including an outlet from which the hot gas flows in a first generally horizontal direction;

first and second economizers, each having an inlet and an outlet, for heating liquid flowing therethrough by bringing the liquid into heat exchange relationship with the hot gas, said economizers being downstream, in the first generally horizontal direction of the gas, of said source of hot gas and mounted side-by-side, extending in a second generally horizontal direction substantially transverse to the first direction;

an intra-economizer flow channel extending between said first and second economizers for directing hot gas exiting said first economizer after flowing in heat exchange relationship with the liquid flowing within said first economizer, from said first economizer into said second economizer to flow in a heat exchange relationship with the liquid flowing within said second economizer;

an inlet flow channel extending from said source outlet to said first economizer inlet;

said inlet flow channel and said intra-economizer flow channel being mounted side-by-side substantially parallel to and adjacent said first and second economizers, and between said first and second economizers and said source; and wherein said first economizer has a top and a bottom, and has a gas inlet adjacent said top and a gas outlet adjacent said bottom; wherein said second economizer has a top and a bottom, and has a gas inlet adjacent said second economizer top and a gas outlet adjacent said second economizer bottom; wherein gas flows from said source outlet to said first economizer inlet, and said intra-economizer flow channel extends from said outlet of said first economizer into said inlet of said second economizer.

22. An economizer system as recited in claim 21 wherein said intra-economizer flow channel comprises a first intra-economizer flow channel; and further comprising: a third economizer, having a top and bottom and an inlet adjacent said third economizer top and an outlet adjacent said third economizer bottom; and a second intra-economizer flow channel; said third economizer mounted side-by-side with said second economizer extending in said second direction, and said second intra-economizer flow channel mounted side-by-side with said first intra-economizer flow channel, and transporting gas from said second economizer outlet to said third economizer inlet.

\* \* \* \* \*